(No Model.)  E. J. PENNINGTON.  7 Sheets—Sheet 1.
ENGINE.

No. 570,439. Patented Oct. 27, 1896.

(No Model.)

E. J. PENNINGTON.
ENGINE.

No. 570,439.  Patented Oct. 27, 1896.

7 Sheets—Sheet 2.

Witnesses:

Inventor:
Edward J. Pennington,
By _____ Attorneys.

(No Model.) 7 Sheets—Sheet 3.

E. J. PENNINGTON.
ENGINE.

No. 570,439. Patented Oct. 27, 1896.

Witnesses:
F. C. Brecht
Edwin Cruse

Inventor:
Edward J. Pennington,
by H. W. T. Howard,
Attorneys.

(No Model.) 7 Sheets—Sheet 4.

E. J. PENNINGTON.
ENGINE.

No. 570,439. Patented Oct. 27, 1896.

Witnesses:
T. C. Brecht
Edwin Cruse.

Inventor:
Edward J. Pennington,
by Howard
Attys.

(No Model.)
E. J. PENNINGTON.
ENGINE.
No. 570,439.
7 Sheets—Sheet 5.
Patented Oct. 27, 1896.
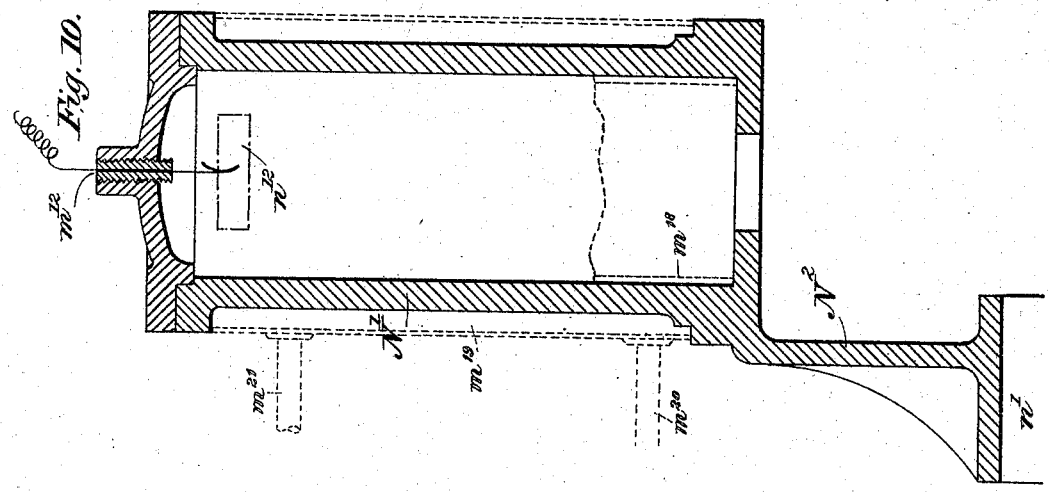
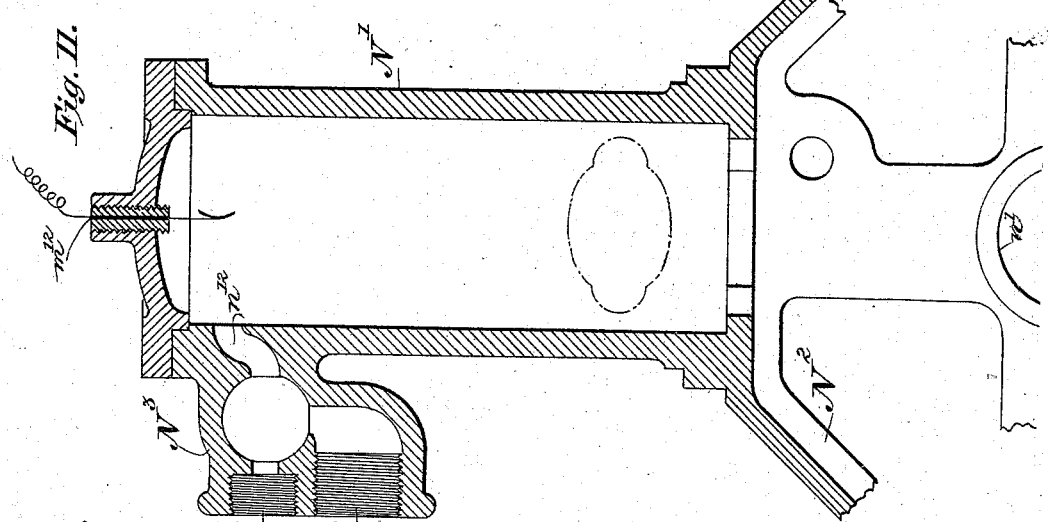
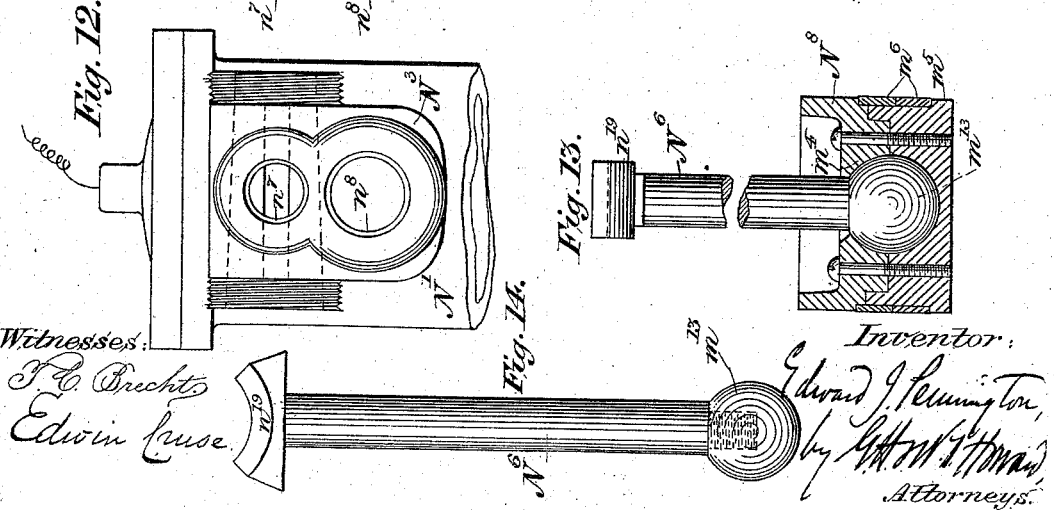

(No Model.)
7 Sheets—Sheet 6.
E. J. PENNINGTON.
ENGINE.
No. 570,439. Patented Oct. 27, 1896.
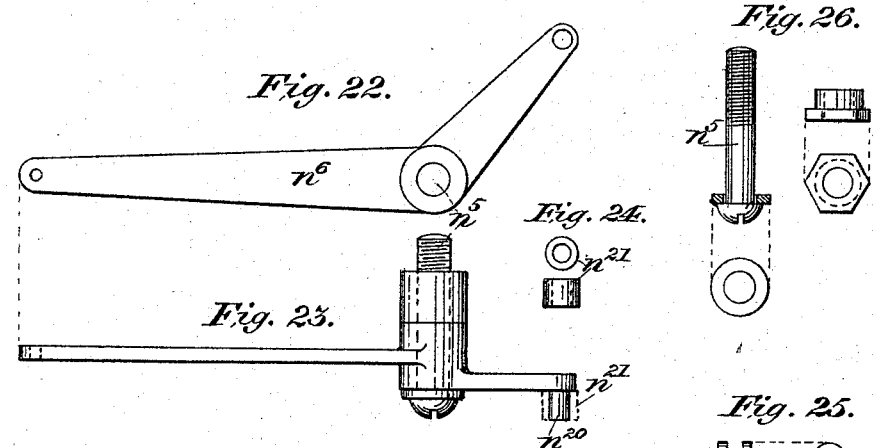
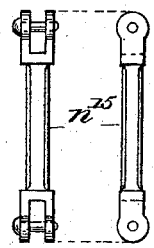
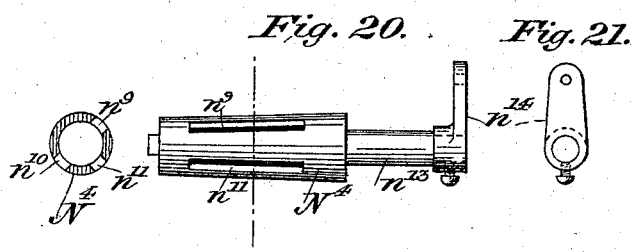
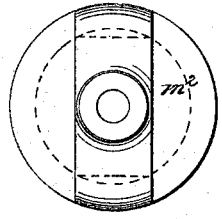
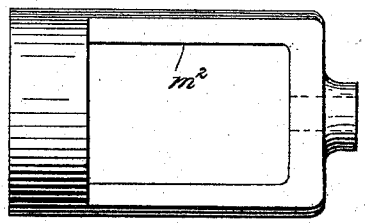
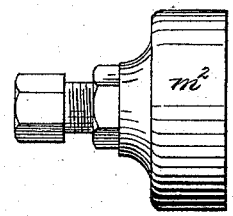
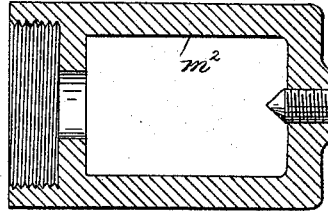
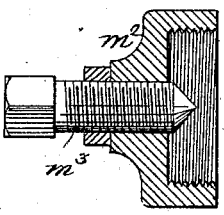
Witnesses:
T. C. Brecht
Edwin Kruse
Inventor:
Edward J. Pennington,
by [attorneys' signature]
Attorneys.

(No Model.) 7 Sheets—Sheet 7.

E. J. PENNINGTON.
ENGINE.

No. 570,439. Patented Oct. 27, 1896.

Witnesses:
T. C. Brecht
Edwin Cruse

Inventor:
Edward J. Pennington,
by [signature]
Attorney.

UNITED STATES PATENT OFFICE.

EDWARD J. PENNINGTON, OF MOUNT CARMEL, ILLINOIS.

ENGINE.

SPECIFICATION forming part of Letters Patent No. 570,439, dated October 27, 1896.

Application filed July 21, 1892. Serial No. 440,771. (No model.)

*To all whom it may concern:*

Be it known that I, EDWARD J. PENNINGTON, of Mount Carmel, in the county of Wabash and State of Illinois, have invented certain new and useful Improvements in Engines, of which the following is a specification, reference being had to the accompanying drawings, and to the letters of reference marked thereon.

My invention relates more particularly to a gas-engine, or one driven by the expansion of gas caused by the explosion of a mixture of fluids—as, for example, atmospheric air and hydrogen gas—the explosion being caused by the ignition of the mixture through the medium of an electric spark. The engine is more especially designed as a motor for the propulsion of an aerial vessel.

Figure 1:
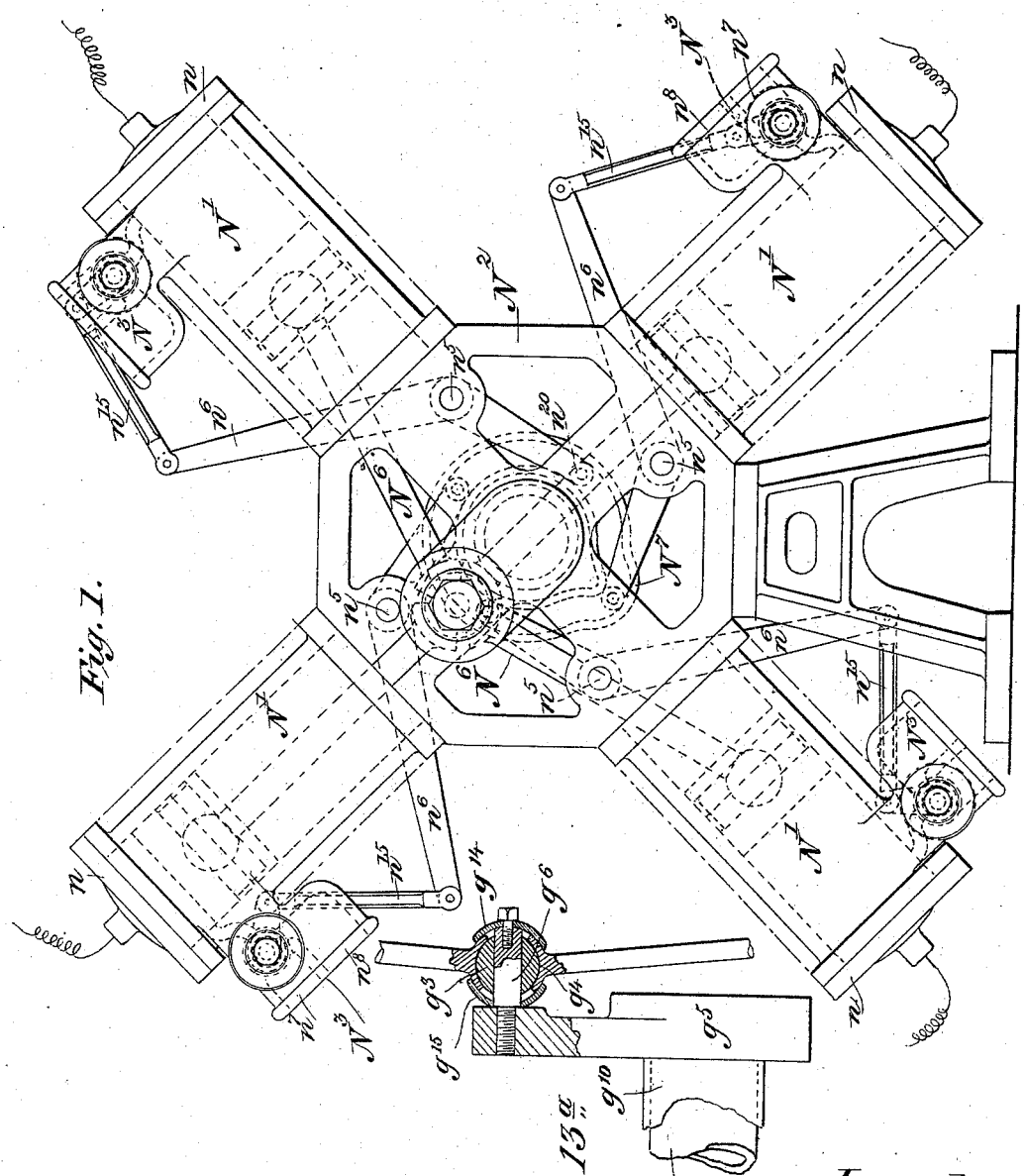
Figure 2:
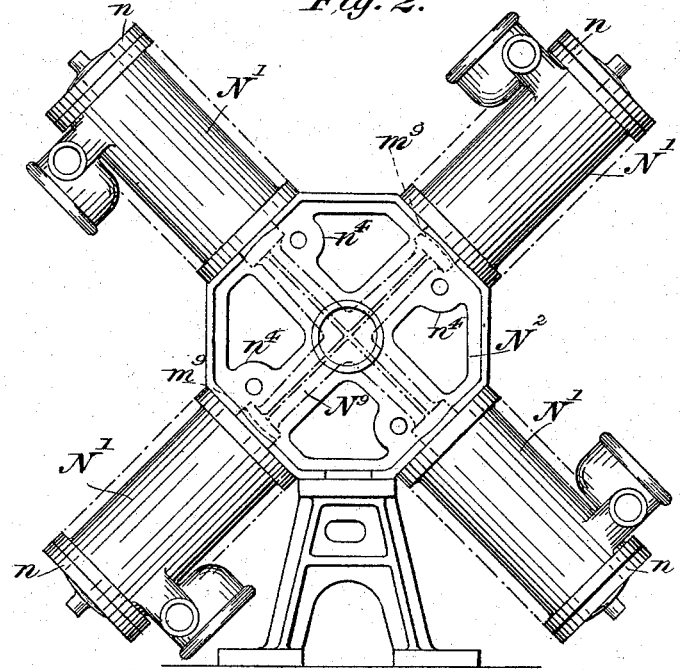
Figure 3:
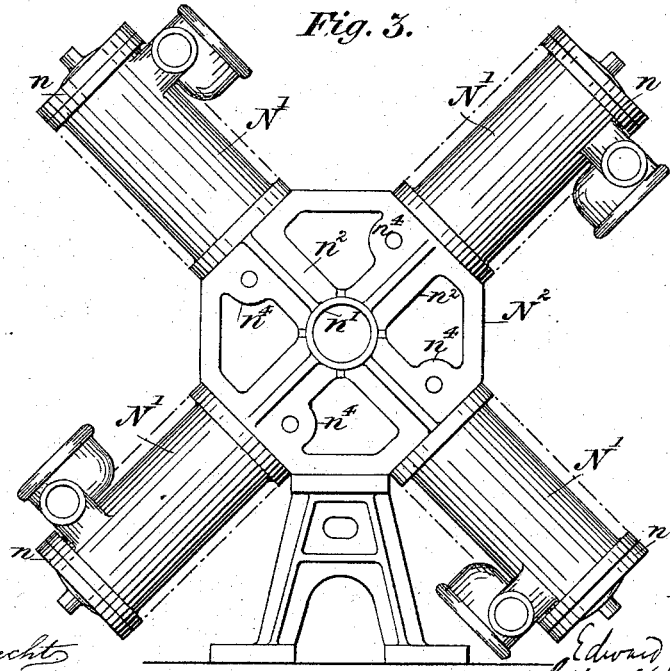
Figure 4:
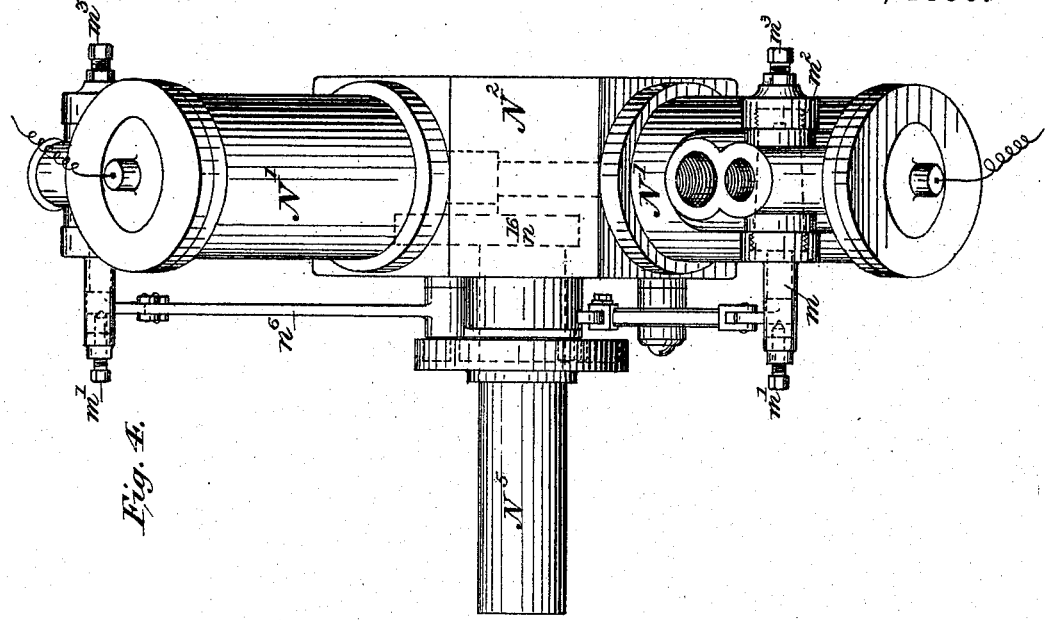
Figure 5:
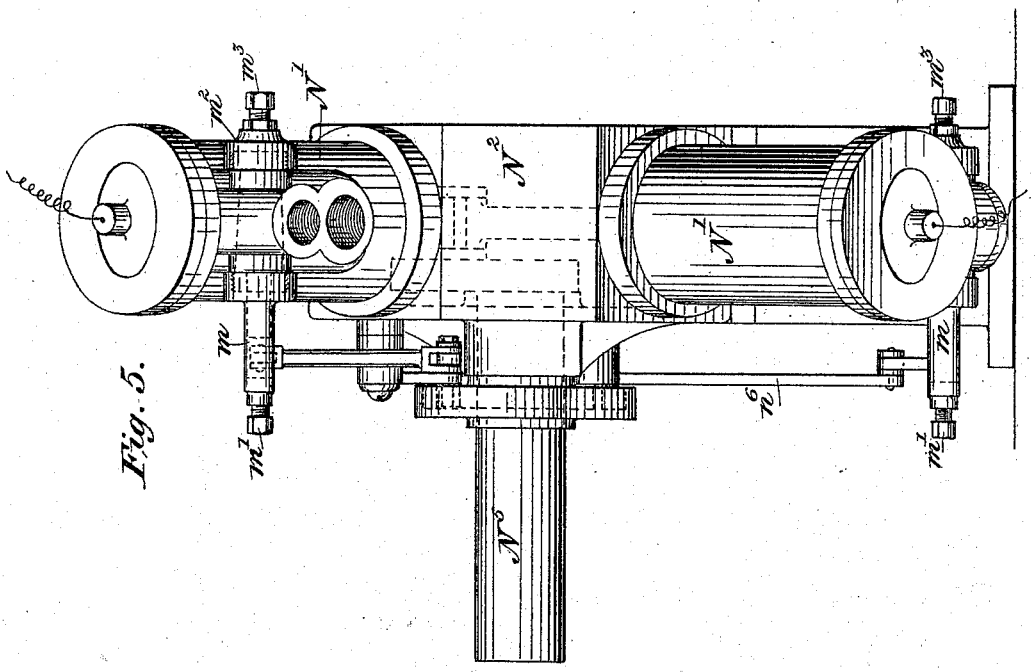
Figure 6:
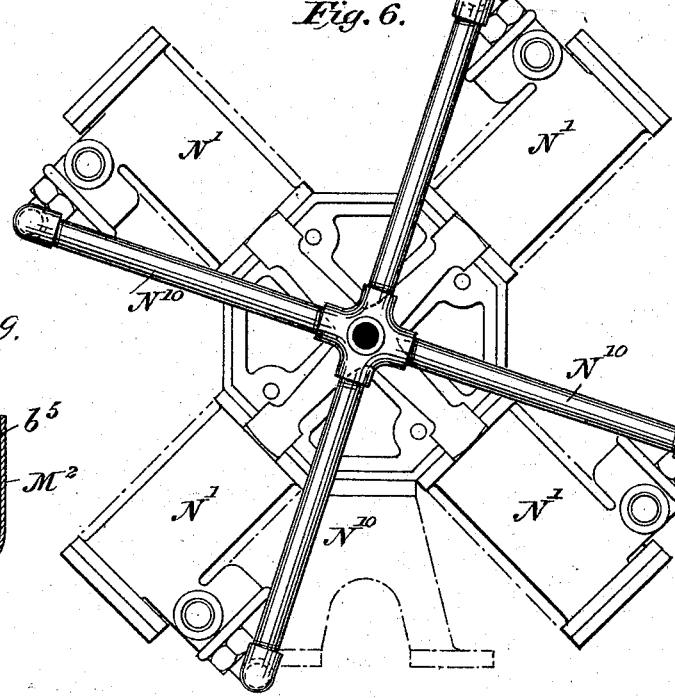
Figure 29:
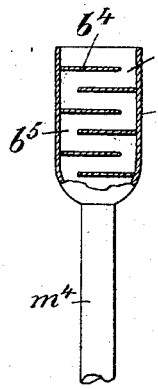
Figure 7:
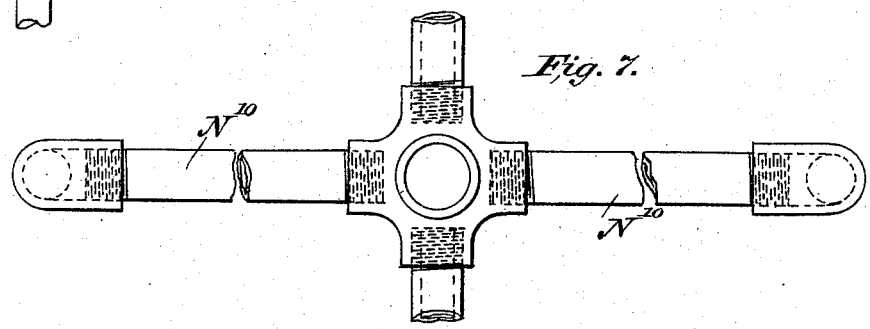
Figure 8:
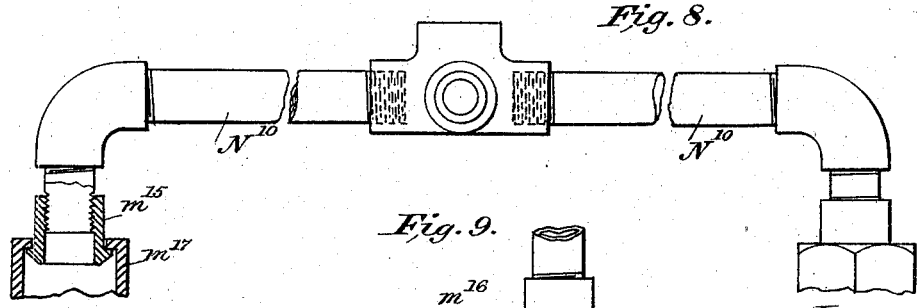
Figure 9:
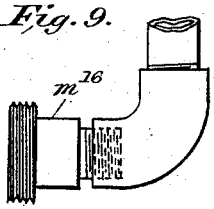
Figure 27:
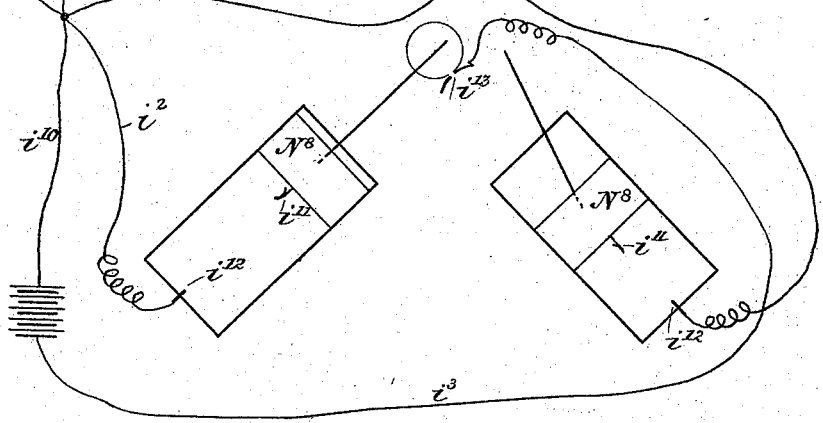
Figure 28:
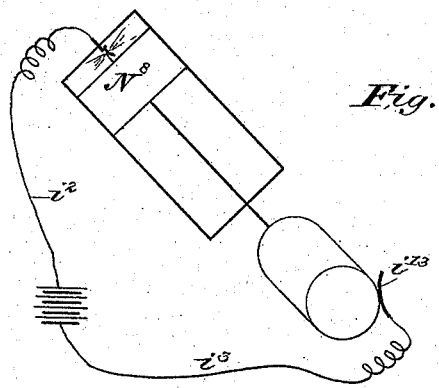

In the accompanying drawings, Figure 1 is a front elevation of my improved engine. Figs. 2 and 3 are elevations, one being the reverse of the other, and upon reduced scale, of the framework and cylinders of the engine, the crank, connecting-rods, valve mechanism, &c., being removed. Fig. 4 is a plan, and Fig. 5 a side, view of the engine connected up. Fig. 6 is an elevation showing the pipe-connection for uniting the cylinders, and by means of which the motive fluid is supplied thereto. Figs. 7 and 8 show a portion of said pipe-connection detached from the cylinders and enlarged. Fig. 9 is a detail of the said pipe-connection. Figs. 10 and 11 are longitudinal sections of a cylinder, showing certain details applied thereto. Fig. 12 is a part elevation of the cylinder shown in Fig. 11. Fig. 13 is a view indicating a piston in section and a portion of a connecting-rod in elevation. Fig. 13$^a$ is a detached view, partly in section, of the crank, crank-pin, and two connecting-rods, their mode of union to the crank-pin being shown. Fig. 14 is an elevation of a connecting-rod detached from its piston. Figs. 15 to 19, inclusive, show details of the valve-operating mechanism. Figs. 20 to 26, inclusive, represent other details of the valve mechanism upon a more reduced scale. Figs. 27 and 28 are diagrams showing the electrical connections for firing or igniting the charges of gas in the cylinders. Fig. 29 is a sectional view of a device for muffling the sound of the exhaust.

Similar letters of reference indicate similar parts in the respective figures.

$N'$ $N'$ $N'$ $N'$ are four cylinders mounted upon a frame $N^2$. The frame is shown of octagon form, but may be of any other preferred shape, and is supported and secured to the floor or other foundation in any suitable manner. The cylinders may stand, if preferred, with their central lines vertical and horizontal. The cylinders $N'$ may be either homogeneous with the frame or suitably secured thereto. The inner end of each cylinder $N'$ is open or unprovided with a head, while its opposite or outer end is furnished with a head $n$.

The frame $N^2$ is provided at its outer or rear side with a shaft-bearing $n'$, having a four-armed support $n^2$ attached to or cast solid with the frame. The four-armed support $n^2$ is provided with four lugs $n^4$, in which are secured the pivots $n^5$ of the valve-levers or bell-cranks $n^6$. Each cylinder is provided with a valve-casing $N^3$, having two branches $n^7$ and $n^8$, the former for connection with the supply-pipe, and the latter with the exhaust. Each of the valve-casings $N^3$ supports a tapered valve-barrel $N^4$, made hollow in the usual manner, and provided with three ports $n^9$ $n^{10}$ $n^{11}$. Each cylinder is provided with a port $n^{12}$, which communicates with the interior of the valve-barrel, through whichever of its ports is made, in the operation of the engine, to register therewith, the port $n^{12}$ serving as both an inlet and an exhaust. The stem $n^{13}$ of each valve-barrel $N^4$ is provided with an arm $n^{14}$, which is attached to the long arm of a valve-lever or bell-crank $n^6$ by means of a link $n^{15}$.

Upon the engine-shaft $N^5$ is mounted the crank $n^{16}$. A crank-wheel may be used instead of the crank shown.

The inner end of each connecting-rod $N^6$ is made concave, as shown in Figs. 13 and 14, so as to fit the crank-pin. The shoulders $n^{19}$ of the piston-rod engage rings surrounding and secured to the crank-pin in such manner as to secure the rods in place, as will be readily understood.

Upon the engine-shaft $N^5$ is mounted the valve-operating cam $N^7$, having a groove of such formation as to receive, guide, and give the requisite motions to the pins $n^{20}$ of the respective valve-levers or bell-cranks $n^6$, which pins are each provided with a rotatable thimble $n^{21}$. Screwed upon a threaded projection of the valve-casing $N^3$ is a yoke $m$, in which is a pointed set-screw $m'$, which centers in the end of the valve-stem, while the opposite threaded projection of the valve-casing is provided with a screw-cap $m^2$, having a similar set-screw $m^3$, which fits in a depression at the smaller end of the valve-barrel. By means of these set-screws the requisite adjustments may be given to the valve-barrel in its casing, so that nicety of operation is at all times insured.

The connection between each connecting-rod and its piston is shown in Fig. 13, from which it will be seen that the connecting-rod is provided with a spherical end $m^{13}$, screwed upon its inner end, which spherical end has its bearings in the two connected halves of the piston. The pistons are each represented generally by $N^8$, the inner half of each being indicated by $m^4$ and the outer half by $m^5$. The faces of the two halves are shouldered and recessed as shown and suitably united by means of set-screws. The packing-rings are represented by $m^6$. The inner half of each piston is provided with a chamfer or bevel, which allows of the necessary play or oscillation of the connecting-rod in the operation of the engine.

$N^9$ is a spider adapted to brace the frame $N^2$, the outer extremities of the spider being provided with grooves which fit over similarly-shaped projections $m^9$ of the frame. The spider and frame are further connected by screw-bolts.

$N^{10}$ is a crossed-pipe connection uniting the four cylinders and furnishing the means whereby the mixture of atmospheric air and hydrogen gas is admitted, as required, to the cylinders. Each branch of the crossed-pipe connection $N^{10}$ is provided with a threaded coupling, upon which screws a thimble $m^{15}$, having a beveled and ground face which rests upon a correspondingly-shaped seat of a similar thimble $m^{16}$, attached to the inlet-nozzle $n^7$ of the valve-casing $N^3$. The thimble $m^{16}$ is exteriorly threaded, and receives a nut $m^{17}$, which, engaging a shoulder of the thimble $m^{15}$, will, when turned, draw the thimbles together and cause a gas-tight joint to be made. At the central point of the crossed-pipe connection $N^{10}$ is a valve, by means of which the requisite amount of atmospheric air may be admitted for admixture with the hydrogen. The exhaust-branches $n^8$ unite with a similar crossed pipe, the central connection of which leads to any desired point of discharge of the products produced by the ignition of the gas.

A muffling device for use with the exhaust-pipe is shown in Fig. 29.

$M^2$ is an enlargement of the exhaust-pipe $m^4$, which attaches to the central connection of the crossed exhaust-pipe, said enlargement having plates $b^4$ arranged so as to provide a zigzag channel $b^5$ for the passage of the products of combustion and muffle the sound of their escape, as will be understood.

In each cylinder-head $n$ is a central opening into which is screwed a perforated insulating substance $m^{12}$.

In Fig. 27 is shown the electrical connections whereby the ignition of the fluid behind each piston is effected. The wires $i^2$ and $i^3$ complete the circuit through whichever cylinder is at the moment to do useful work. Each of the wires $i^2$ extends through the insulating substance $m^{12}$ of one of the cylinders, and each piston $N^8$ has at its outer end a spring-contact $i^{11}$, acting in connection with a similar contact $i^{12}$ on the end of one of the igniting-wires $i^2$. On bringing the contacts $i^{11}$ and $i^{12}$ together, the circuit is closed, a brush $i^{13}$ resting upon the engine-shaft, and being connected with the wire $i^3$, attached to the battery. On bringing the contacts $i^{11}$ and $i^{12}$ of any one cylinder together, the contacts of the other cylinders being separated, the circuit is only closed through that cylinder having the meeting contacts, and upon their separation the spark is produced and the charge of gas fired. This action for each cylinder is timed by the operation of the valve-gearing, as will be readily understood.

The cylinders, frame, spider, cam, valve-gear, pistons, yokes, caps, links, &c., are made of aluminium, while the crank-shaft and connecting-rods are steel, as are the bolts. The packing-rings are brass, as by preference are the pipe-connections. The cylinders are for ornamentation incased with polished sheet aluminium, banded with brass.

In Fig. 10 the cylinder is shown with a steel lining $m^{18}$. In Fig. 13$^a$ a ball-and-socket joint is shown between the connecting-rods and the crank-pin.

While, for the purpose of describing a complete and operative engine, I have included a description and furnished illustrations of a ball-and-socket connection between the crank-pin and the connecting-rods, as also of the piston, I make in this application no claim to such features.

Having described my invention, I claim—

1. In a multiple-cylinder engine, a series of separate cylinders mounted radially upon an open frame, each having a valve-casing and ports as described, a central crank-shaft, pistons, and rods connecting the pistons and crank-shaft, combined with a grooved cam mounted upon the shaft, valve-levers or bell-cranks operated by the grooves of said cam, tapering ported valve-barrels and connections between said barrels and the valve-levers or bell-cranks, substantially as set forth.

2. In a multiple-cylinder engine, the combination of a series of cylinders, a frame, an armed support secured to the frame and constituting a bearing for the crank-shaft, said armed frame being provided with bearings for the pivotal supports of the valve-operating levers, substantially as set forth.

3. In a multiple-cylinder engine, a series of cylinders each having a valve-casing containing an inlet-nozzle, an exhaust-branch and a support for a ported valve arranged transversely of the inlet-nozzle, and a frame constituting a bearing for the crank-shaft, and pivotally sustaining the valve-operating levers, combined with a grooved cam mounted upon the shaft, valve-levers or bell-cranks operated by the grooves of said cam, tapered ported valve-barrels, connections between said barrels and the valve-levers or bell-cranks, and crossed-pipe connections uniting, respectively, the several inlet-nozzles and exhaust-branches, substantially as set forth.

In testimony whereof I hereunto set my hand and seal.

EDWARD J. PENNINGTON. [L. S.]

Witnesses:
 ROBERT BELL,
 WALTER G. ALLISON.